US006629084B1

(12) United States Patent
Kabacaolgu et al.

(10) Patent No.: US 6,629,084 B1
(45) Date of Patent: Sep. 30, 2003

(54) POSTAGE METER MACHINE WITH SEPARATELY STORED SOFTWARE POSTAGE MODULE

(75) Inventors: Hasbi Kabacaolgu, Berlin (DE); Ralf Mueller, Berlin (DE)

(73) Assignee: Francotyp-Postalia AG & Co. KG, Birkenwarder (DE)

( * ) Notice: Subject to any disclaimer, the term of this patent is extended or adjusted under 35 U.S.C. 154(b) by 0 days.

(21) Appl. No.: 09/526,623

(22) Filed: Mar. 16, 2000

(30) Foreign Application Priority Data

Mar. 17, 1999 (EP) .......................................... 99105478

(51) Int. Cl.[7] .............................................. G06F 17/60

(52) U.S. Cl. ....................... 705/401; 717/100; 717/116; 717/121; 717/168

(58) Field of Search ................................ 705/401, 409; 717/100, 116, 121, 168

(56) References Cited

U.S. PATENT DOCUMENTS 4,122,532 A * 10/1978 Dlugos et al. .............. 705/409
4,138,735 A * 2/1979 Allocca et al. ............. 705/409
4,528,644 A * 7/1985 Soderberg et al. .......... 705/410
4,802,218 A * 1/1989 Wright et al. ................. 705/60
4,837,714 A * 6/1989 Brookner et al. ........... 702/108
4,980,542 A * 12/1990 Jackson et al. ............. 235/375
5,359,730 A * 10/1994 Marron ....................... 717/169
6,064,991 A 5/2000 Reisinger et al. ........... 705/401
6,266,055 B1 * 7/2001 Mozdzer et al. ............ 345/866
6,434,617 B1 * 8/2002 Clough et al. .............. 709/227

FOREIGN PATENT DOCUMENTS

EP 0328059 * 8/1989
EP 0 492 439 7/1992
EP 0 825 561 2/1998
EP 0 892 367 1/1999

OTHER PUBLICATIONS

Beaty: "Improved metering equipment and techniques cut cost. (at electric utilites)"; Electric Light & Power, Feb. 1995, vol 73, No. 2, p. 10.*

* cited by examiner

*Primary Examiner*—Edward R. Cosimano
(74) *Attorney, Agent, or Firm*—Schiff Hardin & Waite

(57) ABSTRACT

A postage meter machine has a microprocessor that processes commands of a control program containing a number of software modules for realizing the operating functions of the postage meter machine. The control program includes a postage module that contains postage data and commands for designing a postage user interface to be displayed at a display. The postage module is stored separately from other software modules in a memory module whose content can be modified.

29 Claims, 2 Drawing Sheets

POSTAGE METER MACHINE WITH SEPARATELY STORED SOFTWARE POSTAGE MODULE

BACKGROUND OF THE INVENTION

1. Field of the Invention

The present invention is directed to a postage meter machine of the type having a microprocessor that processes commands of a control program containing a number of software modules for realizing the operating functions of the postage meter machine, the control program including a software postage module that contains postage data and commands and/or data for designing a postage user interface to be presented on a display.

2. Description Of The Prior Art

A postage meter machine of the above type is disclosed in European Application 0 718 801, corresponding to U.S. Pat. No. 6,064,991, assigned to the same assignee (Francotyp-Postalia AG & Co.) as the present application. This document describes a user interface for a postage meter machine, whereby a user is prompted by presentations on a display screen in order to obtain information and to enter data that are required for the operation of the postage meter machine. The postage meter machine contains a microprocessor that processes commands of a control program. The control program contains a number of software modules that respectively generate menu images and prompt the user to enter data. The postage module is an important software module, which contains postage data and commands and/or data for designing the postage user interface to be displayed on the display screen. As is known, the postage rates are included in the postage data, these being dependent on the country of use, for example Germany, Europe, America, and on the type of mail such as letter, postcard, package, and on the type of shipping such as, for example, registered, special delivery, etc. The user is informed of the various shipping possibilities by the postage user interface, which contains at least one menu image, and is supported in the selection of various parameters. For example, the user can select shipping possibilities on the display using soft keys or scroll keys and can select a suitable parameter. Further, there is the possibility of branching to further menu images that are arranged in the fashion of a tree structure. In accord therewith, the postage module contains instructions and data for designing the postage user interface. In the prior art, the various software modules of the control program are intermittently linked with one another. When, as a result of an updating, data or commands of the postage module must be modified, then conventionally operations must be performed on the entire control program. In addition to modifying the data commands of the postage module, data and commands of the other software modules also must be adapted. In practice, this means that the entire control program must be subjected to a complex review, enable procedures must be implemented for this new control program, and software quality monitoring as well as function tests for software modules must ensue.

This procedure is complicated and requires substantial developmental outlay.

SUMMARY OF THE INVENTION

An object of the present invention is to provide a postage meter machine wherein a modification of the control program is enabled in a simple way with little outlay and with high operating dependability.

This object is achieved in a postage meter machine having a microprocessor that processes commands of a control program containing a number of software modules for the realization of the operating functions of the postage meter machine, the control program including a postage module that contains postage data and commands and/or data for designing a postage user interface to be displayed on the display, wherein the postage module is stored separately from other modules of the control program in a memory module whose content can be modified, and wherein the postage module offers data at a data interface to further software modules of the control program.

According to the invention, the postage module is stored separately from other software modules of the control program in a memory module whose content can be modified. When postage data and commands and/or data for designing a postage user interface to be displayed on the display are to be modified, then only this memory module need be accessed and the content thereof modified. In this way, the determination of the postage can be expanded by software commands with which it is possible to realize a modified postage calculation. Every modification at the postage module, accordingly, is reduced to a modification of the memory area in the memory module. A modification of the further software modules is not required. Such modifications can relate to postage data, i.e. the rates for the individual postal matter parameters, as well as to the type of graphic presentation on the display. In order for further software modules to be able to access data of the postage module within the framework of processing the overall control program, the postage module has a standardized data interface for data. When the postage module is modified, then this data interface remains the same in terms of its structure. It is then assured that, even given a modified postage module, the data emitted as an output by the modified module can be unproblemmatically further-processed. The data interface, for example, can have a structure such that it references memory areas of the postage module in which the relevant data are stored for an access.

In an embodiment of the invention the control program includes a display module that contains data and instructions for controlling the display, and that the display module also accesses data of the standardized interface. The display module controls the hardware of the display. By accessing the standardized interface of the postage module, the postage module need not contain any hardware-relevant data and commands for the display, and thus cam have a correspondingly reduced capacity. Nonetheless, it is also assured given a modification of-the postage module that the display is properly driven.

In another embodiment of the invention the further software modules of the control program —with the exception of the postage module —are stored in a read-only memory, preferably in an EPROM module. These software modules form so-called Firmware, that is relatively closely adapted to hardware components of the postage meter machine. Accordingly, these software modules need not be modified often during the service life of a postage meter machine, since hardware components of the postage meter machine likewise need to be modified only seldomly. The corresponding software modules are therefore stored in an inexpensive read-only memory.

Preferably, an EEPROM module that can be programmed by the microprocessor is provided as the memory module having variable contents. This EEPROM module contains the data and commands of the postage module. Given a modification or replacement of the overall postage module, the programming of the EEPROM module can ensue via the microprocessor itself.

In one version of the invention, the modification of the content of the programmable memory module can ensue by transmitting data and commands via a modem or another suitable device interface, from a data central to the postage meter machine, i.e. a remotely controlled reloading of the memory module ensues. These measures make it possible that the user of the postage meter machine will have to expend only a minimal outlay if the postage module must be modified.

Another possibility of modifying the content of the programmable memory module is to store the data and commands for the postage module on a storage card, for example a chip card. The data are then read in a microprocessor-supported manner for reloading the programmable memory module, and are communicated from the card reader to the memory through the microprocessor.

In another version the programmable memory module is utilized as a replaceable component. For modifying the postage module, the memory module is replaced by a different one. This measure in fact requires a hardware intervention into the postage meter machine. Given a favorable arrangement of the memory module, however, the demands made of the technical expertise of the operating personnel are relatively slight.

In another embodiment of the invention that programming data relating to the postage user interface are reloaded into the programmable memory module separately from postage data. As a result of regulations of the applicable post office, postage data can change relatively frequently. A separate reloading of postage data and programming data for the postage user interface has the advantage that the programming outlay for generating such data is reduced. The development outlay when modifying the postage module is therefore also correspondingly reduced.

In a further embodiment of the invention, the control program can generally contain a menu module that contains commands and/or data for designing a user interface to be displayed on the display. This menu module can, for example, be a service module that, in addition to containing data and commands for designing a service user interface, also contains test data with which function tests of the postage meter machine can be implemented. When the menu module must be modified, then it suffices to modify the content of the memory module. Further modifications of the firm wear or of other software modules are not required. The further software modules of the control program access data via the data interface. As long as this data interface also remains unmodified given a modification-of the menu model, the proper function of the postage meter machine is assured.

DESCRIPTION OF THE PREFERRED EMBODIMENTS

Figure 1:
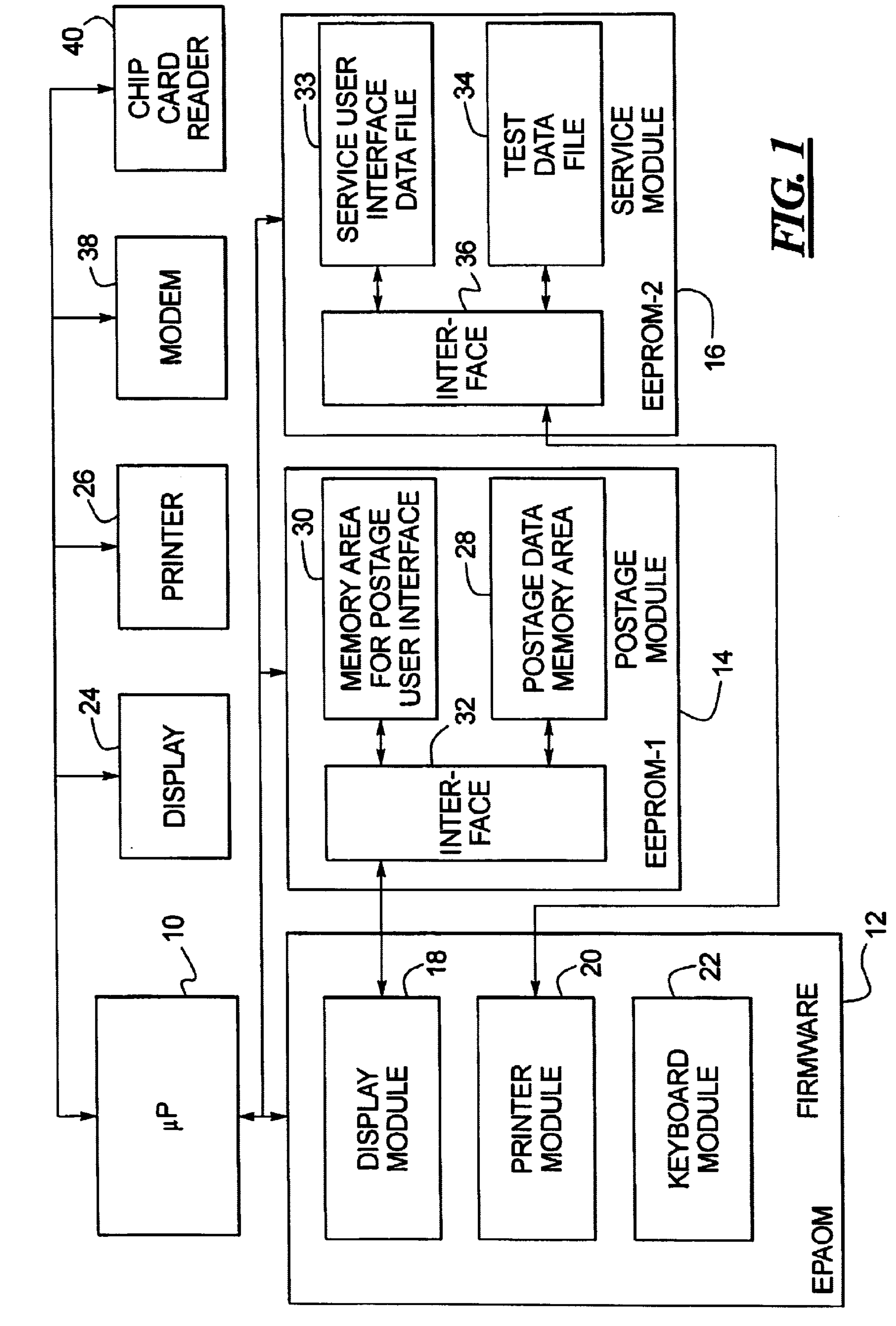
FIG. 1 is a block diagram of a first embodiment of a postage meter machine constructed and operating in accordance with the principles of the present invention.

Exemplary embodiments of the invention are explained below with reference to the figures. The figures show the components of a postage meter machine which are important for the present invention. The content of the aforementioned U.S. Pat. No. 6,064,991 provides further details, this being incorporated herein by reference.

In both embodiments a microprocessor 10 processes the commands of a control program in order to realize the operating functions of the postage meter machine. This control program includes software modules that are combined to form firmwear 12 and also includes a postage module 14 and a service module 16. As software modules, for example, the firmwear 12 contains a display module 18 for controlling a display 24, a printer module 20 for controlling a postage imprint printer 26, a keyboard module 22 for controlling the data input via a keyboard (not shown), as well as further software modules that are not indicated in greater detail. The software modules 18,.20, 22 of the firmware 12 are stored in an EPROM module.

The postage module 14 contains a memory area 28 for postage data as well as a memory area 30 for a postage user interface. This latter memory area 30 contains commands and/or data for designing a postage user interface tube displayed on the display 24. This postage user interface informs the user of the postage meter machine about possible characteristic postal quantities and prompts the user in the selection of necessary parameters. The memory areas 28 and 30 have a communicative connection to a standardized data interface 32. This data interface 32 remains essentially unmodified when the content of the memory areas 28, 30 changes. The standardized data interface 32 is in turn in communication with the software modules of the firmware 12, for example the display module 18, and exchanges data therewith. In the embodiment of FIG. 1, the data and commands of the postage module 14 are stored in an EEPROM module EEPROM-1. This module EEPROM-1 can be loaded with new data for the memory areas 28 and 30 via the data interface 32 with the assistance of the microprocessor 10.

Figure 2:
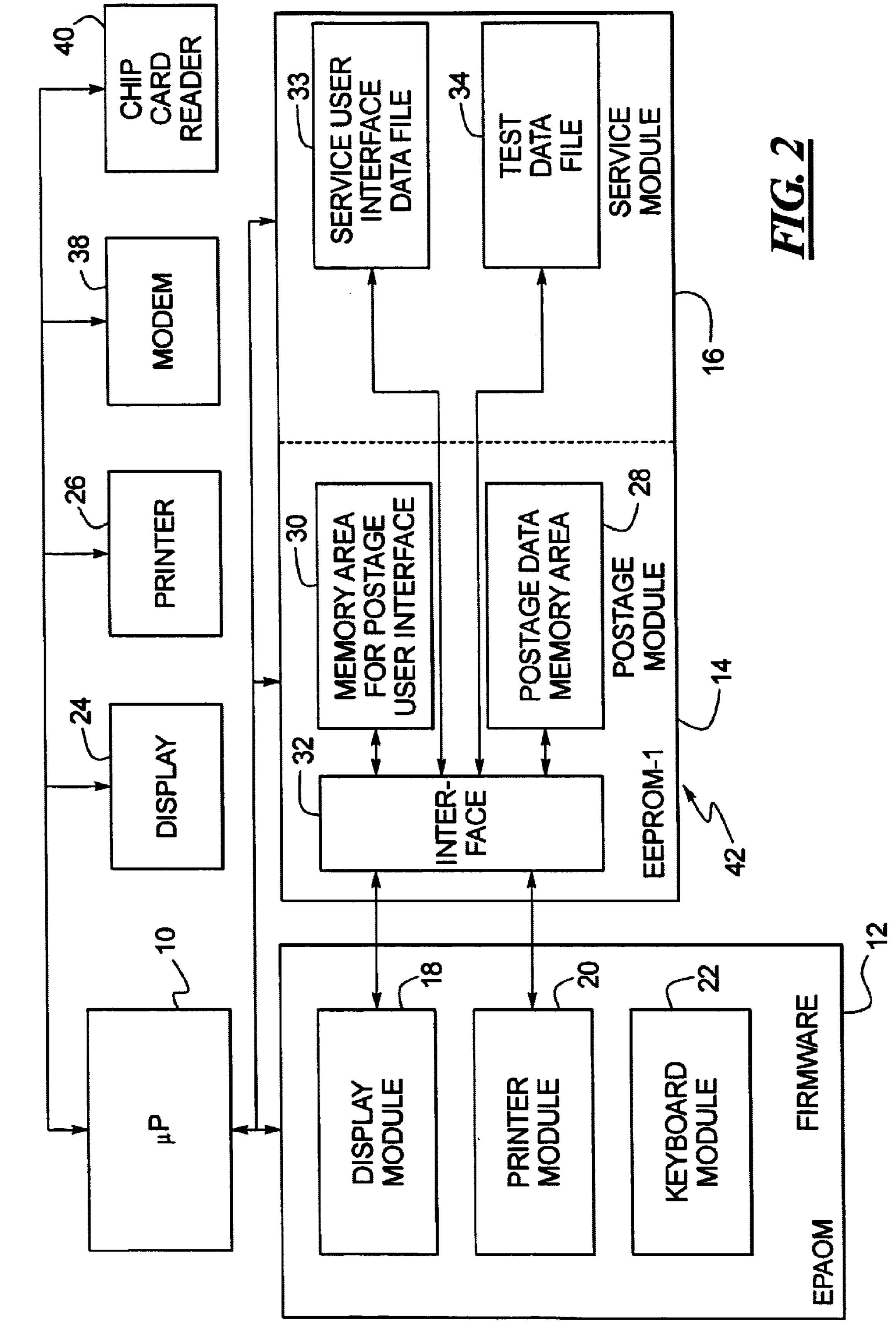
FIG. 2 is a block diagram of a second embodiment of a postage meter machine constructed and operating in accordance with the principles of the present invention.

In the embodiment of FIG. 2, the service module 16 contains a data file 33 for a service user interface as well as a data file 34 for test data. The data files 33, 34 are connected to a standardized data interface 36 that exchanges data with software modules, for example the printer module 20, of the firmware 12. Hardware tests of the postage meter machine can be carried out with the assistance of the service module 16. For example, the operating function of the printer 26 is checked with the assistance of the service module. Further, a calibration of the scale for determining the weight of the postal matter or other hardware tests can also ensue. In this test procedure, the user—for example, a service technician—is informed on the basis of displayed information on the display 24 and is prompted in the selection of possible parameters.

The microprocessor 10 controls the display 24, the printer 26, a modem 38 and a chip card reader 40 via an input/output module.

The functioning of the embodiment of FIG. 1 is explained below. With the assistance of the postage module 14, the postage fee for the postal matter to be franked is identified. This postage fee is dependent on the occasion to which the postal matter is sent, on the type of postal matter, for example letter, postal, printed matter, goods shipment, package, small package, etc., and on the type of franking, for example standard letter, registered, registered with return receipt, express mail, etc. The available information are displayed to the user on one or more menu images of the postage user interface; with the assistance of a user prompting, the user can determine the necessary postage parameter. When the postage rates change during the course of the service life of the postage meter machine or when the equation for determining postage changes, then the corresponding data and commands in the postage module 14 must be modified. A separation between firmware 12 and postage module 14 is assured due to the selected structure, since the data and commands of the postage module are stored in a separate memory, the programmable memory module EEPROM-1. The new postage data or the commands and data for designing the postage user interface can, for example, be stored on a chip card. The operator then has the data read in via the chip card reader 40 and transmitted to the module EEPROM-1. To this end, the microprocessor 10 assumes control. The operator, of course, must identify himself or herself as being authorized using known identification procedures. Another possibility is to read in the modified data for the postage module 14 via the modem 38 from a remote data central. This type of data transmission is also known and need not be explained in further detail herein. The modifications in the postage module 14 also can relate to the design of the overall postage user interface. For example, the presentation of the postage user interface can be modified or the significance of a soft key for selecting postage parameters can be changed.

As can be seen, no intervention to the firmware 12 must be carried out given a modification of the postage module 14, the firmware 12 being stored in an EPROM module. Thus, no software development work need be carried out for the software modules belonging to the firm ware. The development outlay in the modification of the control program in the segment of determining postage therefore remains low. The postage data or the commands and data for the postage user interface in the postage module 14 can be modified separately or together as well by reloading.

One proceeds similarly given a modification of the service module 16 as in the case of the postage module 14. The data and commands stored in the module EEPROM-2 can be modified separately from the firm ware 12. The modem 38 or the chip card reader 40 can thereby also be employed. In this way, the operating function of the service module can be modernized and amended without having to intervene in the numerous software modules of the firm ware 12.

In the embodiment of FIG. 2, identical components have been provided with the same reference numerals as in the above-described embodiment of FIG. 1. In the embodiment of FIG. 2, the postage module 14 and the service module 16 are combined in a single EEPROM 42. The interface 36 is omitted, and the interface 32 is used for the memory area 30 and the postage data memory area 28 of the postage module 14, as in the embodiment of FIG. 1, as well as being used for the service user interface data file 33 and the test data file 34 of the service module 16. Otherwise, the operation of the embodiment shown in FIG. 2 proceeds the same as the embodiment of FIG. 1. All modifications for the embodiment of FIG. 1 discussed above are applicable as well to the embodiment of FIG. 2.

Further modifications of the examples shown in the figures are possible. For example, it can be advantageous to store the test data of the service module 16 in a further EEPROM module. Given modification of these test data, only the content of this further EEPROM module then need be modified. It is also possible to store the commands and data of the service user interface 32 in the memory module EEPROM-1 in the embodiment of FIG. 1; only the test data are then stored in the module EEPROM-2. The memory capacity thereof can then be made correspondingly smaller, i.e. its structural size is then also reduced. Such a module that only contains test data is preferably arranged on the same motherboard as the printer 26. As a result, the test data can be physically allocated to this printer 26. Given replacement of the printer 26, its test data are also replaced.

In another version the display module 18 contains routines and data that are directed to the calculation of the postage fees and the display of the calculated postage. Via the data interface 32, the routines then access the postage data 28 and, if necessary, data of the postage user interface 30. These routines can also be combined to form a separate software module that is allocated to the firm ware 12.

Although modifications and changes may be suggested by those skilled in the art, it is the intention of the inventors to embody within the patent warranted hereon all changes and modifications as reasonably and properly come within the scope of their contribution to the art.

We claim as our invention:

1. A postage meter machine comprising: a microprocessor which processes commands from a control program containing a plurality of software modules for respective operating functions;

a first memory area accessible by said microprocessor in which said software modules of said control program are stored;

a display connected to said microprocessor;

said control program also including a postage module which contains postage module data selected from the group consisting of postage data and commands, and data for designing a postage user interface to be displayed on said display;

a second memory area accessible by said microprocessor in which said postage module data are stored separately from said software modules in said control program, said postage module data being modifiable in said second memory area with no intervention to said software modules in said first memory area; and a data interface via which said postage module provides said postage module data from said second memory area data to said software modules in said first memory area.

2. A postage meter machine as claimed in claim 1 wherein said control program includes a display module which contains data and commands for controlling said display, and wherein said display module accesses said postage module data from said postage module via said data interface.

3. A postage meter machine as claimed in claim 1 wherein said postage module stores said postage data in said second memory area as a postage table.

4. A postage meter machine as claimed in claim 1 further comprising a modem connected to said microprocessor, for receiving incoming data from an external source for reloading said second memory area.

5. A postage meter machine as claimed in claim 1 further comprising a chip card reader connected to said microprocessor, and a chip card readable by said chip card reader containing reloading data for reloading said postage module data in said second memory area.

6. A postage meter machine as claimed in claim 1 wherein said postage data comprises both said postage data and commands, and said data for designing a postage user interface, and wherein said microprocessor loads said data for designing a postage user interface into said second memory area separately from loading said postage data and commands.

7. A postage meter machine as claimed in claim 1 comprising a replaceable memory module, containing said second memory area, which can be removed from said postage module.

8. A postage meter machine as claimed in claim 1 wherein said data interface remains unchanged given modification of said postage module data in said second memory area.

9. A postage meter machine as claimed in claim 1 wherein said first memory area is a read-only memory.

10. A postage meter machine as claimed in claim 9 wherein said read-only memory is an EPROM module.

11. A postage meter machine as claimed in claim 1 comprising memory module containing said second memory area, which is programmable by said microprocessor to modify said postage module data.

12. A postage meter machine as claimed in claim 11 wherein said memory module which is programmable by said microprocessor is an EEPROM module.

13. A postage meter machine comprising:

- a microprocessor which processes commands from a control program containing a plurality of software modules for respective operating functions;
- a first memory area accessible by said microprocessor in which said software modules of said control program are stored;
- a display connected to said microprocessor;
- said control program also including a menu module which contains menu module data selected from the group consisting of data and commands, and data for designing a menu user interface to be displayed on said display;
- a second memory area accessible by said microprocessor in which said menu module data are stored separately from said software modules in said control program, said menu module data being modifiable in said in said second memory area with no intervention to said software modules in said first memory area; and
- a data interface via which said menu module provides said menu module data from said second memory area data to said software modules in said first memory area.

14. A postage meter machine as claimed in claim 13 comprising a replaceable memory module, containing said second memory area, which can be removed from said postage module.

15. A postage meter machine as claimed in claim 13 wherein said data interface remains unchanged given modification of said menu module data in said second memory area.

16. A postage meter machine as claimed in claim 13 wherein said first memory area is a read-only memory.

17. A postage meter machine as claimed in claim 16 wherein said read-only memory is an EPROM module.

18. A postage meter machine as claimed in claim 13 wherein said menu module comprises a service module which, in addition to said commands and data for designing a user interface, contains test data for testing said functions.

19. A postage meter machine as claimed in claim 18 further comprising an additional programmable memory, containing said test data, said additional programmable memory having modifiable contents.

20. A postage meter machine as claimed in claim 19 further comprising a printer connected to said microprocessor, and wherein said additional programmable memory contains data for printing by said printer.

21. A postage meter machine as claimed in claim 13 comprising memory module containing said second memory area, which is programmable by said microprocessor to modify said postage module data.

22. A postage meter machine as claimed in claim 21 wherein said memory module which is programmable by said microprocessor is an EEPROM module.

23. A postage meter machine as claimed in claim 22 further comprising a modem connected to said microprocessor, for receiving incoming data from an external source for reloading said second memory area.

24. A postage meter machine as claimed in claim 23 further comprising a chip card reader connected to said microprocessor, and a chip card readable by said chip card reader containing reloading data for reloading said postage module data in said second memory area.

25. A postage meter machine comprising:

- a microprocessor which processes commands from a control program containing a plurality of software modules for respective operating functions;
- a first memory area accessible by said microprocessor in which said software modules are stored;
- a display connected to said microprocessor;
- said control program also including a postage module which contains postage module data selected from the group consisting of postage data and commands, and data for designing a first user interface to be displayed on said display;
- said control program also including a menu module which contains menu module data selected from the group consisting of service data and commands, and data for designing a second user interface to displayed on said display;
- a second memory area accessible by said microprocessor in which said postage module data are stored separately from said software modules in said control program and a third memory area accessible by said microprocessor in which said menu module data are stored separately from said software modules in said control program, said postage module data being modifiable in said second memory area with no intervention to said software modules in said first memory area and said menu module data being modifiable in said third memory area with no intervention to said software modules in said first memory area; and
- at least one data interface via which said postage module data and said menu module data are provided respectively from said first memory and said second memory area to said software modules in said first memory area.

26. A postage meter machine as claimed in claim 25 wherein said second memory area is separate from said third memory area, and wherein said postage meter machine comprises a first data interface for interfacing said postage module data in said second memory area with said software modules in said first memory area, and a second data interface for interfacing said menu module data in said third memory area with said software modules in said first memory area.

27. A postage meter machine as claimed in claim 26 comprising a first EEPROM containing said second memory area, and a second EEPROM containing said third memory area.

28. A postage meter machine as claimed in claim 25 comprising a single memory module containing said second and third memory areas, said single memory module containing a single data interface for interfacing both said postage module data and said menu module data with said software modules in said first memory area.

29. A postage meter machine as claimed in claim 28 wherein said single memory module is an EEPROM. second memory area with no intervention to said software modules in said first memory area; and

- a data interface via which said menu module provides said menu module data from said second memory area data to said software modules in said first memory area.

* * * * *